Figure 1:
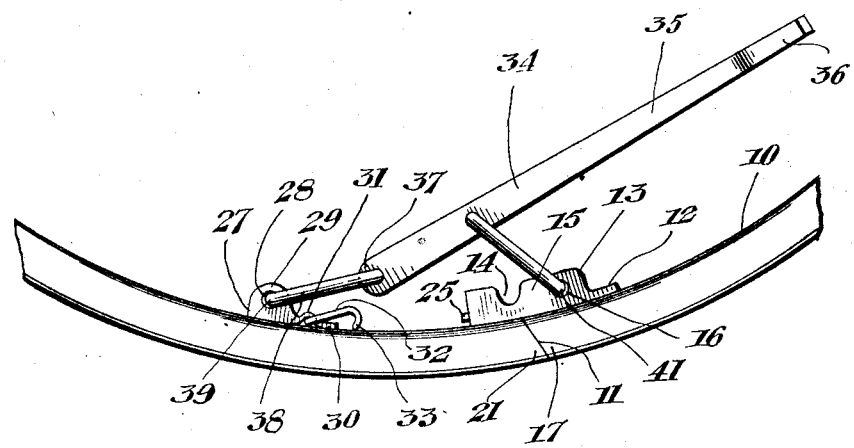

April 24, 1928.

A. CAMERON 1,667,243

WHEEL RIM LOCKING AND CONTRACTING APPLIANCE

Filed June 12, 1926  2 Sheets-Sheet 1

INVENTOR.
ANGUS CAMERON.
BY
ATT'YS.

April 24, 1928.  1,667,243
A. CAMERON
WHEEL RIM LOCKING AND CONTRACTING APPLIANCE
Filed June 12, 1926   2 Sheets-Sheet 2

INVENTOR.
ANGUS CAMERON.
BY
ATT'YS.

Patented Apr. 24, 1928.

1,667,243

UNITED STATES PATENT OFFICE.

ANGUS CAMERON, OF SUMMERSTOWN, ONTARIO, CANADA, ASSIGNOR OF FIFTY-TWO ONE-HUNDREDTHS TO WILLIAM DOUGLAS KNIGHT, OF CORNWALL, ONTARIO, CANADA.

WHEEL-RIM LOCKING AND CONTRACTING APPLIANCE.

Application filed June 12, 1926. Serial No. 115,661.

This invention relates to improvements in wheel rim locking and contracting appliances and the objects of the invention are to provide combined rim locking and tire removing means whereby the rim is locked in normal position and, on being contracted, is automatically locked in contracted position.

Further objects are to provide a device of this character of durable and simplified construction that can be manufactured with the rim and at very low cost.

Further objects are to provide, in combination with the locking means formed on the rim, a tool for operating said means.

With the foregoing and other objects, hereinafter more fully referred to, in view the invention consists of combined locking and tool engaging members rigidly mounted in spaced relationship to one another on the rim and having intermediately thereof an engaging lug or the like designed, in normal position, to lock with one of said members, the members so locked being designed, on the rim being contracted, to automatically engage with the other locking member to engage with a rim contracting tool whereby the rim is contracted to bring the locking members together and lock them.

Figure 2:
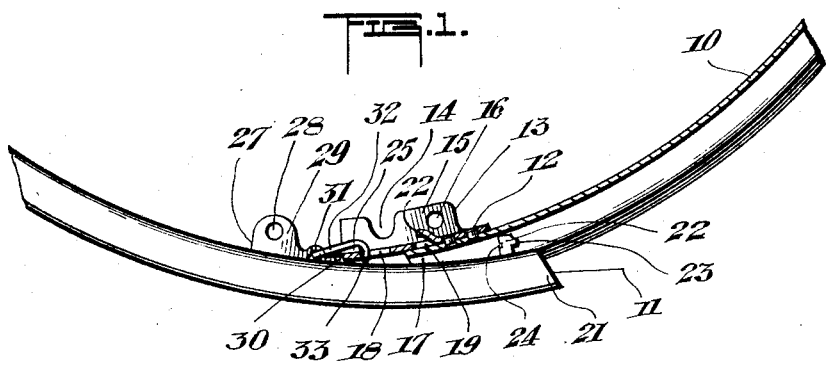
Figure 3:
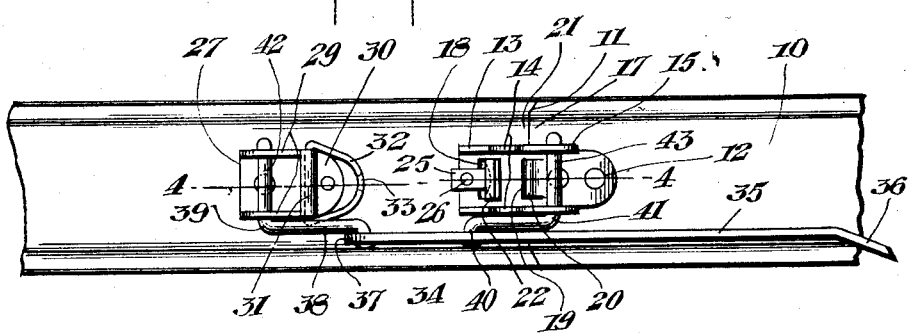
Figure 4:
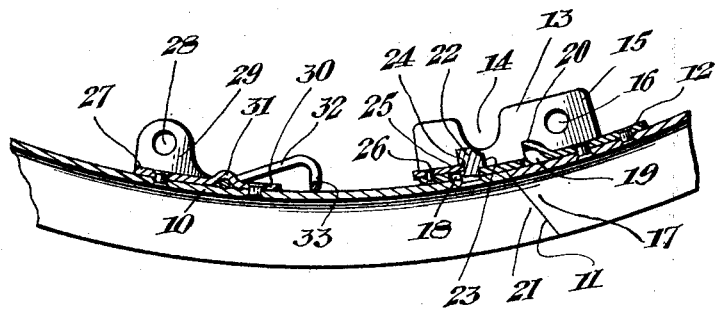
Figures 5, 6:
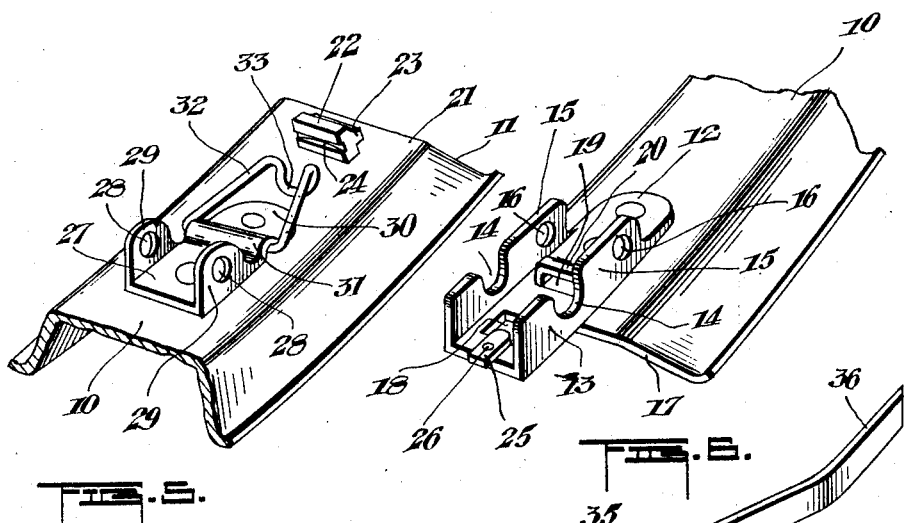
Figure 7:
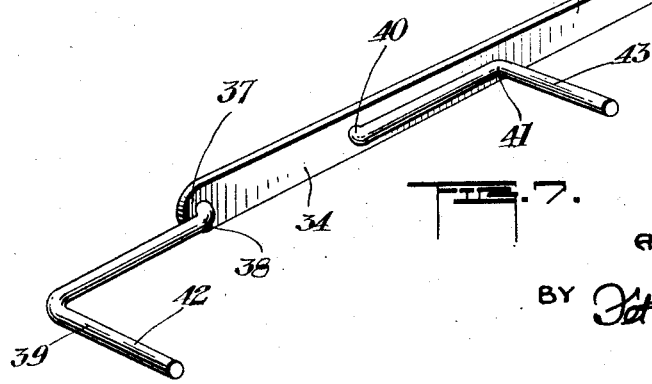

Referring now to the drawings in which like characters of reference indicate corresponding parts in each figure:

Figure 1 is a fragmentary side elevation in normal position of a rim fitted with my improved rim locking and contracting appliance and with the rim contracting tool in engagement therewith, Figure 2 is a fragmentary side elevation partly in section showing the rim contracted and the locking members automatically engaging with one another to lock the rim in contracted position, Figure 3 is a plan view of Figure 1, Figure 4 is a section on line 4—4 of Figure 3, Figure 5 is an enlarged perspective view of the section of the rim showing one of the rim locking and tool engaging members and the intermediate engaging lug, Figure 6 is an enlarged fragmentary perspective of the other rim locking and tool engaging member, and Figure 7 is a perspective detail of the rim contracting and expanding tool.

Referring now more particularly to the drawings in which a preferred example of my invention is illustrated, 10 designates a tire rim of well known construction and of any suitable material. This rim is transversely split at 11 and has rigidly secured adjacent one of the ends, as at 12, a channel-shaped plate 13 open at both ends and formed with opposing recesses 14 in the sides 15; also orifices 16 in said sides registering with one another and designed, as hereinafter more fully explained, to engage with a rim contracting tool. This plate or combined rim locking and tool engaging member 13 protrudes beyond the end 17 of the rim and is provided with an opening 18 in the bottom and, spaced therefrom, a second opening or slot 19 with an overlapping lip 20 adapted to engage, as hereinafter more fully referred to, with the handle end of the contracting tool whereby the member 13 is prised or raised up out of engagement.

Across the split 11 and adjacent the other end 21 of the rim is a lug 22 formed with a transversely extending lip 23 on one side and a slot 24 on the other side. This lug is designed to engage with and lock in the opening 18 in the member 13, see Figure 4, the lip 23 engaging with the end of the opening 18 to positively lock the lug therein while, for further retaining it in the opening 18 and preventing side movement, I provide a locking member 25 pivotally mounted at 26 in the member 13 and designed to engage in operative position with the slot 24 in the lug 22 and, in inoperative position, to be swung outwardly to permit the locking member to disengage with the lug 22 on the member 13 being raised.

Spaced from the lug 22 on the rim 10 is a second locking and tool-engaging member or plate 27 formed with orifices 28 registering with one another in the sides 29. The base of this member extends beyond the sides 29, as at 30, and is formed with a transversely extending groove or channel 31 in which is pivotally mounted a link 32 bent downwardly as at 33 at its outer end. This link member, as illustrated in Figure 2, is designed, on the rim 10 being contracted by means of the tool 34, to automatically engage with the opening 18 in the member 13 and lock the rim in contracted position.

The tool 34 consists of a lever arm 35 bent adjacent its outer end, as at 36, to form a prising or raising means to engage with the lip 20 in the member 13 to unlock it by lifting it out of engagement with the lug 22. For contracting the rim the arm 35 is provided, at its outer extremity as at 37, with an arm or rod 38 pivotally mounted and bent substantially midway of its length at right angles as at 39. A second arm, spaced from the arm 38, is also pivotally mounted in the arm 35, as at 40, and is bent at right angles to itself and to the arm 35 as at 41. The bent portions 42 and 43 of the pivotally mounted rods in the arm 35 are designed, as illustrated in Figure 1, to simultaneously engage with the orifices 28 in the member 27 and with the orifices 16 in the member 13 so that, on the arm 35 being manually operated, the rim is contracted to the position illustrated in Figure 2. The hooked link 32 is then automatically engaged and locked in the opening 18 of the member 13.

As many changes could be made in the above construction and many apparently widely different embodiments of my invention, within the scope of the claims, constructed without departing from the spirit or scope thereof, it is intended that all matter contained in the present specification and accompanying drawings shall be interpreted in an illustrative and not in a limiting sense.

What I claim as my invention is:

1. The combination with a transversely split tire supporting rim, of a locking plate rigidly secured on one side of the split and extending across the split and having an opening therein, a swingingly mounted hook on the opposite side of the split to the locking plate engaging the opening therein to hold the rim contracted.

2. The combination with a transversely split tire supporting rim, of a locking plate rigidly secured on one side of the split and extending across the split and having an opening therein, a swingingly mounted hook on the opposite side of the split to the locking plate engaging the opening therein to hold the rim contracted, and means associated with the opening in the locking plate for locking the rim in contracted position.

In witness whereof I have hereunto set my hand.

ANGUS CAMERON.